United States Patent [19]

Sato

[11] Patent Number: 4,981,245
[45] Date of Patent: Jan. 1, 1991

[54] STAPLER AND STAPLE

[76] Inventor: Hisao Sato, Daini-Hikariso, 10, Toyotamaminami 3-Chome, Nerima-Ku, Tokyo, Japan

[21] Appl. No.: 335,316

[22] Filed: Apr. 10, 1989

[30] Foreign Application Priority Data

Apr. 9, 1988 [JP] Japan .............................. 63-47910[U]
Apr. 19, 1988 [JP] Japan .............................. 63-52476[U]
Sep. 20, 1988 [JP] Japan ............................ 63-123107[U]

[51] Int. Cl.$^5$ ............................................. B25C 5/02
[52] U.S. Cl. .................................... 227/78; 227/127; 227/156; 411/473; 411/483
[58] Field of Search ................ 227/78, 124, 127, 128, 227/129, 134, 125, 123, 120, 156; 411/442, 443, 470–473, 483, 485

[56] References Cited

U.S. PATENT DOCUMENTS

| 327,974 | 10/1885 | Tauran | 411/483 X |
| 3,706,115 | 12/1972 | Bleile | 411/470 |
| 4,113,164 | 9/1978 | Muthenthaller | 227/124 |
| 4,288,018 | 9/1981 | Taniguchi | 227/78 X |
| 4,556,161 | 12/1985 | Oide | 227/120 X |
| 4,795,073 | 1/1989 | Yamamoto et al. | 227/120 |

FOREIGN PATENT DOCUMENTS 410788 6/1945 Italy .................................. 411/472

Primary Examiner—Frank T. Yost
Assistant Examiner—Rinaldi Rada
Attorney, Agent, or Firm—Kanesaka and Takeuchi

[57] ABSTRACT

Disclosed is a stapler and a staple to be used in the stapler, by which a slip or the like can be permanently or temporarily fastened with the staple onto ground paper, corrugated cardboard, or the like so that the slip or the like can be easily removed therefrom without taking off the staple. The staple has one supporting portion and one stapling leg portion bent at one end of the supporting portion substantially perpendicularly thereto. The stapler has a staple accommodating portion, wherein a forward one of the staples is always located at a staple drive-out opening formed at the forward end of the staple accommodating portion. The staple accommodating portion has a body and a staple holder mounted in the body. The holder has a side portion disposed so as to form an interval between the side portion and one side wall of the body and a horizontal portion extending substantially horizontally from the upper end of the side portion to the other side wall of the body to thereby hold the supporting portion of the staple. Only the one stapling leg portion pierces ground paper and is bent at the rear surface of the ground paper to nip the ground paper.

13 Claims, 9 Drawing Sheets

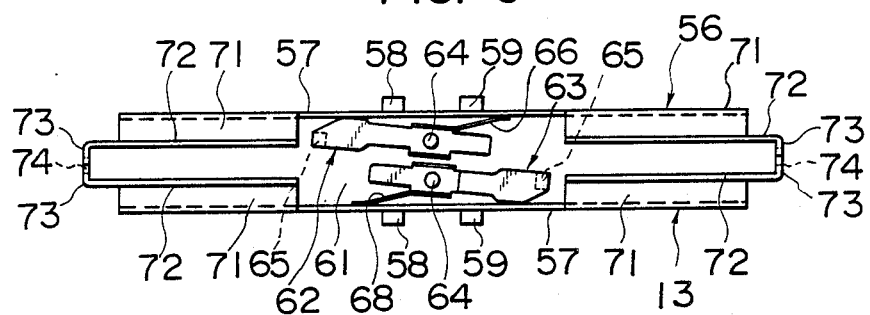
FIG. 9
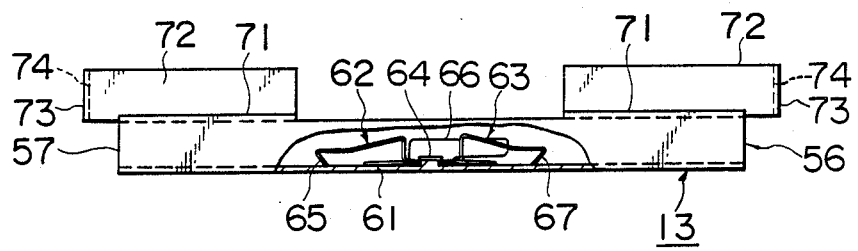
FIG. 10
FIG. 11
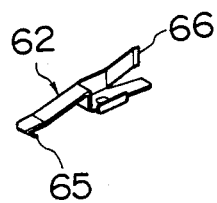
FIG. 12
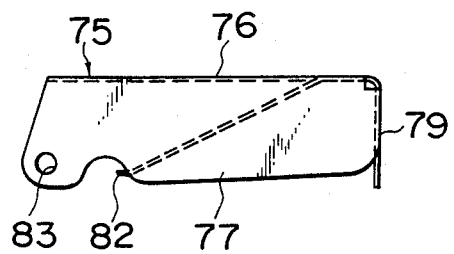

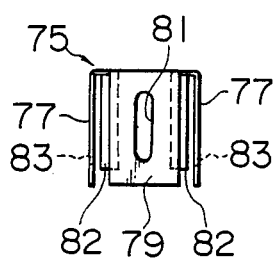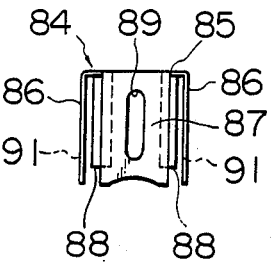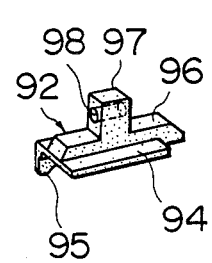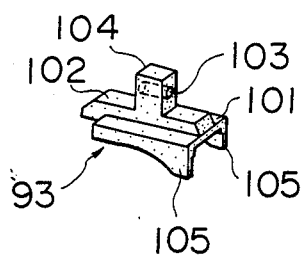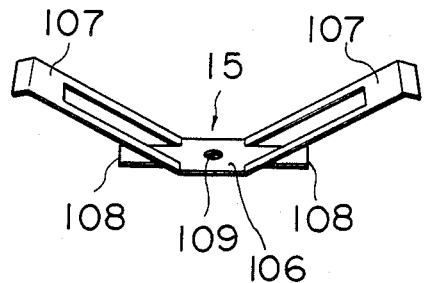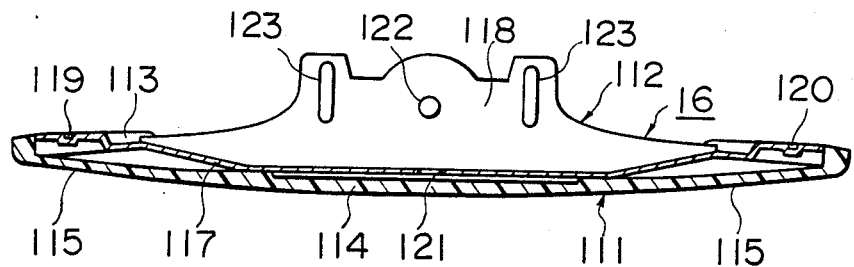

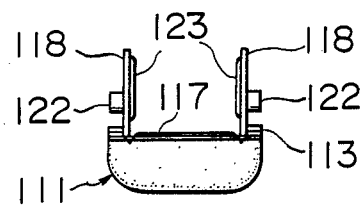
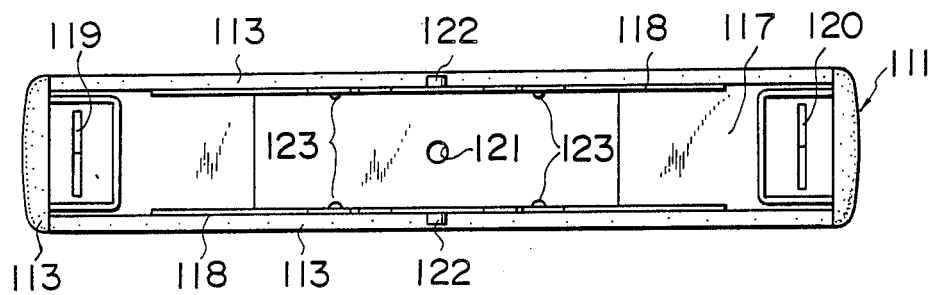
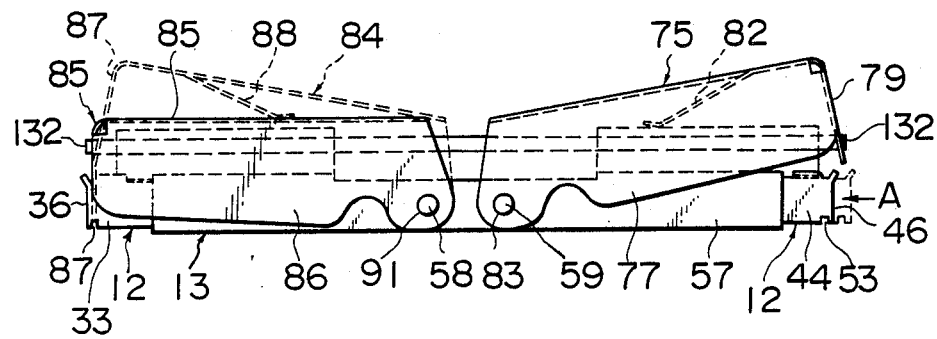
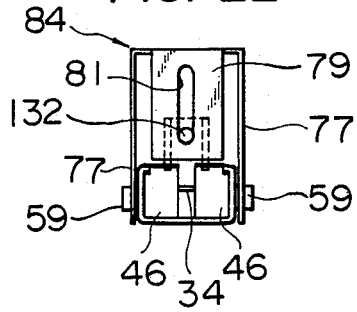

STAPLER AND STAPLE

BACKGROUND OF THE INVENTION

1. Field of the Invention

The present invention relates to staplers for stapling sheets of paper, sheets of corrugated cardboard, sheets of thin plywood, or the like, and staples used therein. In particular, the present invention relates to a stapler and a staple, by which a slip, a memorandum, or the like, can be temporarily fastened by the staple with ground paper, corrugated cardboard, or the like, so that the slip or the like can be easily unfastened without taking off the staple.

2. Description of the Prior Art

A stapler is widely used, for example, when a plurality of sheets are to be bundled up into an accumulation, or when a memorandum, a slip, or the like, carrying a list of received articles, a destination, etc., written thereon, is to be temporarily fastened onto a pasteboard, a corrugated cardboard, or the like. Taking into consideration capability of penetrating materials to be stapled, each of staples for use in such a stapler as described above is constituted by a wire-like linear body having a supporting portion and a pair of parallel stapling leg portions extending from the opposite ends of the supporting portion substantially perpendicularly thereto. The stapler is constituted by three members, that is, a base member having a matrix in which a bending groove for bending the stapling leg portions of a staple is formed, a staple supporting member accommodating staples and having a staple drive-out opening formed in opposition to the bending groove, and a pressing rotary member disposed behind the staple drive-out opening for pressing the staples toward the staple drive-out opening. These three members are pivotally supported at an end portion of the staple supporting member opposite to the staple drive-out opening. In general, the staples in the predetermined number are separably serially connected in the form of a bar of staples so that the bar of staples can be easily loaded in the staple supporting member. The bar of staples is pressed by the pressing rotary member toward the staple drive-out opening in the staple supporting member so that the forward one of the staples is always located at the staple drive-out opening.

In stapling, a stack of sheets of paper to be stapled is inserted between the matrix of the base member and the staple supporting member so as to bring a portion to be stapled of the stack of sheets into the position where the matrix and the staple drive-out opening are faced to each other, and the pressing rotary member is pressed down toward the base member. Then, the forward one of the staples is pinned into the stack of sheets through the staple drive-out opening. Thus, the forward free ends of the stapling leg portions of the driven staple pass through the stack of sheets to abut against the groove bottom of the bending groove in the matrix, and then bent by about 90 degrees along the shape of the groove bottom of the bending groove by the pressure exerted by the pressing rotary member so that the free ends of the stapling leg portions are pressed against the rear surface of the lowermost sheet. Accordingly, the supporting portion of the staple is pressed against the front surface of the uppermost sheet as well as the stapling leg portions thus bent are pressed against the rear surface of the lowermost sheet, so that the sheets in the given number can be stapled into an accumulation.

As described above, a plurality of sheets can be easily fastened through the staple of this type. Accordingly, the staple of this type is effectively used both in the case where a stack of sheets is stapled perpetually and in the case where a stack of sheets is stapled temporarily before the stack of sheets are regularly attached on another stack of sheets. In the latter case, it is necessary to unfasten the temporarily used staple. When, for example, the stack of sheets is thick, the staple can be easily unfastened from the thick stack of sheets while the stapling leg portions of the staple are opened by inserting a thin metal piece between the uppermost sheet and the supporting portion of the staple to pull up the supporting portion. In the case the stack of sheets is thin, on the contrary, not only the uppermost sheet but other sheets under the uppermost one may be broken when such a metal piece is inserted. Further, holes through which the stapling leg portions have been passed may be enlarged when the supporting portion of the staple is pulled up. It is therefore necessary to take an unfastening procedure in which the bent stapling leg portions are reformed linearly, and the stapling leg portions are pulled out from the supporting portion of the staple carefully.

In packing articles into a box, on the other hand, a mending tape or the like is used for temporarily fastening a memorandum or slip carrying a list of received articles, a destination, and the like, written thereon, onto the box. In the case where the box is formed of corrugated cardboard or in the case where the memorandum of slip should be used in the further, however, there is a possibility that the memorandum or the upper sheet of the corrugated cardboard may be broken when the mending tape is peeled off.

SUMMARY OF THE INVENTION

It is an object of the present invention to provide a stapler by which a memorandum, a slip, or the like, which will be removed in the future, can be fastened temporarily so that the memorandum, slip or the like can be removed easily.

It is another object of the invention to provide a staple which is to be used in the stapler and which is suitable for fastening a memorandum, a slip, or the like, temporarily.

It is a further object of the invention to provide a stapler which serves as a regular stapler and as a temporary stapler as described above, that is, a stapler for selectively performing regular stapling and temporary stapling.

In order to achieve the above objects, according to an aspect of the present invention, provided is a stapler having at least a stapler portion for performing stapling with a staple having a supporting portion and a stapling leg portion extending from an end of the supporting portion substantially perpendicularly to the supporting portion, the stapler comprising: a handle portion; a staple pressing-out portion attached to a lower surface of the handle portion; a staple acccommodating portion having a staple drive-out opening at its forward end portion, the staple drive-out opening being selected to have a size substantially equal to a thickness of the staple so as to allow the pressing-out portion to pass through the staple drive-out opening, the staple being pressed in the staple accommodating portion toward the staple drive-out opening; a base portion disposed on a lower surface of the staple accommodating portion, an end of the handle portion, an end of the staple pressing-out portion opposite to the pressing-out side thereof and an end of the staple accommodating portion opposite to the staple drive-out opening being pivotally supported by the base portion at one end of the base portion, the base portion having at its other end a guide groove for bending the stapling leg portion of the staple; an elastic member disposed between the base portion and the staple accommodating portion for elastically pressing the base portion and the staple accommodating portion so as to widen a distance between the staple drive-out opening and the guide groove; the staple accommodating portion including a substantially U-shaped body provided with the staple drive-out opening formed at its forward end portion, a staple holder attached in the body, and a cover portion for slidably holding the body, the staple holder having a height substantially equal to the height of the stapling leg portion of the staple, the staple holder having a side portion disposed at a sufficient interval from one side wall of the body so as to allow the stapling leg portion of the staple to pass through the interval, the staple holder further having one end extending substantially horizontally from the upper end of the side portion and the other longitudinal end abutting on the other side wall of the body.

According to an aspect of the present invention, provided is a staple having a supporting portion and a stapling leg portion bent at one end of the supporting portion substantially perpendicularly to the supporting portion, the staple being arranged so that when the stapling leg portion is pierced through a stack of objects to be stapled and is bent to be in parallel to the supporting portion, the stack of objects is nipped between the supporting portion abutting on an upper surface of the stack of objects and the stapling leg portion abutting on a lower surface of the stack of objects.

By use of the aforementioned stapler and staple, the one stapling leg portion of the staple is pierced through a stack of sheets of paper or the like to be stapled and is bent along the rear surface of the lowermost sheet of paper. The supporting portion of the staple is located on the front surface of the uppermost sheet of paper. As the results, the stack of sheets of paper can be nipped between the supporting portion and the one staple leg portion thus bent. In this case, the stack of sheets of paper thus stapled temporarily is not disjointed unless a strong force is applied onto the stack of sheets. If it is desired to remove upper one or more sheets of paper from the stack, the one or more sheets can be removed by moving the sheets in a direction opposite to the end of the supporting portion connected to the stapling leg portion. Accordingly, in the case a memorandum, a slip, or the like is to be temporarily fastened onto a sheet of paper, a sheet of corrugated cardboard or a box, the memorandum, the slip or the like can be fastened by applying the one stapling leg portion, so that the memorandum, the slip or the like thus fastened can be unfastened easily by moving the memorandum, the slip or the like.

Other objects and advantages of the present invention will be more apparent from the following description of preferred embodiments in conjunction with accompanying drawings.

BRIEF DESCRIPTION OF THE DRAWINGS

FIG. 9 is a front view showing the case cover;

FIG. 10 is a partially cutaway front view showing the case cover of FIG. 9;

FIG. 11 is a perspective view showing one lock spring in the case cover;

FIG. 12 is a front view showing the pressing-out portion for regular stapling;

FIG. 13 is a right side view showing the regular stapling pressing-out portion of FIG. 12;

FIG. 14 is a left side view showing the pressing-out portion for temporary stapling;

FIG. 15 is a perspective view showing the staple pressing-out member in the temporary stapling pressing-out portion;

FIG. 16 is a perspective view showing the staple pressing-out member in the regular stapling pressing-out portion;

FIG. 17 is a perspective view showing the spring portion;

FIG. 18 is a front view showing the base portion in longitudinal section

FIG. 19 is a side view showing the base portion of FIG. 18;

FIG. 20 is a plan view showing the base portion of FIG. 18;

FIG. 21 is a front view showing the condition in which the staple cases, the case cover and the staple pressing-out portions are assembled into one assembly;

FIG. 22 is a right side view showing the assembly of FIG. 21;

DETAILED DESCRIPTION OF THE PREFERRED EMBODIMENTS

Preferred embodiments according to the present invention will be described hereunder with reference to the accompanying drawings.

Figure 1:
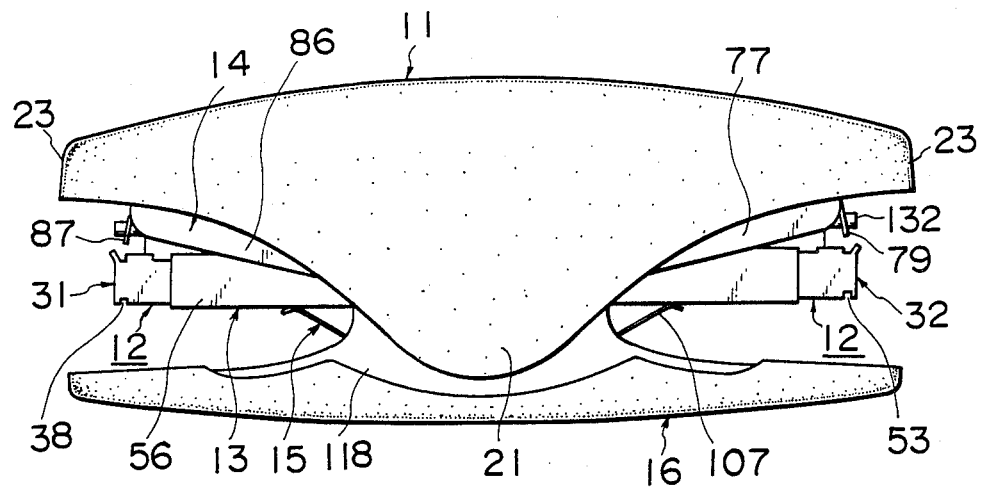
FIG. 1 is a front view showing an embodiment of the stapler according to the present invention.
Figure 2:
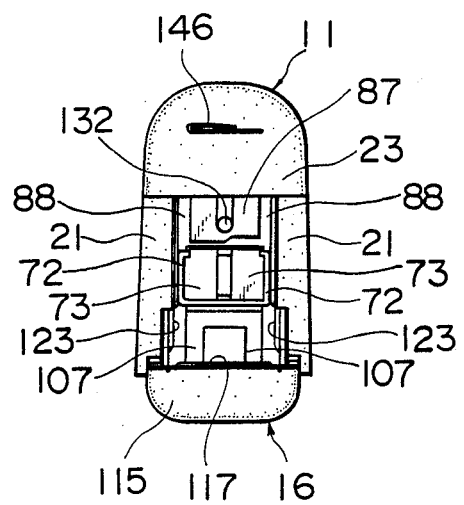
FIG. 2 is a left side view showing the embodiment of FIG. 1.

Referring to FIG. 1, there is shown a stapler having a temporary stapler portion for performing temporary stapling and a regular stapler portion for performing regular stapling. As shown in FIG. 1, in general, the stapler is constituted by a long handle portion 11, a pair of staple cases 12 disposed within the handle portion 11, a case cover 13 for holding these staple cases 12 slidably, a pair of staple pressing-out portions 14 for pressing out the staples in the staple cases 12, a spring portion 15 for continuously elastically keeping the case cover 13 substantially horizontally, and a base portion 16 for pivotally supporting the handle portion 11.

As shown in detail in FIGS. 1 through 4, the handle portion 11 integrally formed of synthetic resin has a pair of substantially sector-shaped side portions 21 and 21 disposed opposite to each other, a roof plate portion 22 for covering the upper ends of the side portions 21 and 21, and a pair of end portions 23 and 23 for blocking the opposite ends surrounded by the side portions 21 and 21 and the roof plate portion 22. The roof plate portion 22 is provided with a pair of projections 24 and 25 at the rear surface thereof in the vicinity of the end portions 23 and 23. The projections 24 and 25 are formed to extend downward so that the staple pressing-out portions 14 are engaged thereto, respectively. Arc-shaped rib edges 26 are formed in the respective inner surfaces of the side portions 21 and 21 at the substantially central lower ends thereof. Further, supporting holes 27 are formed in the respective inner surfaces of the side portions 21 and 21 at the center positions of the arc-shaped rib edges 26. The depth of each of the rib edges 26 is reduced toward the supporting hole 27.

Figure 3:
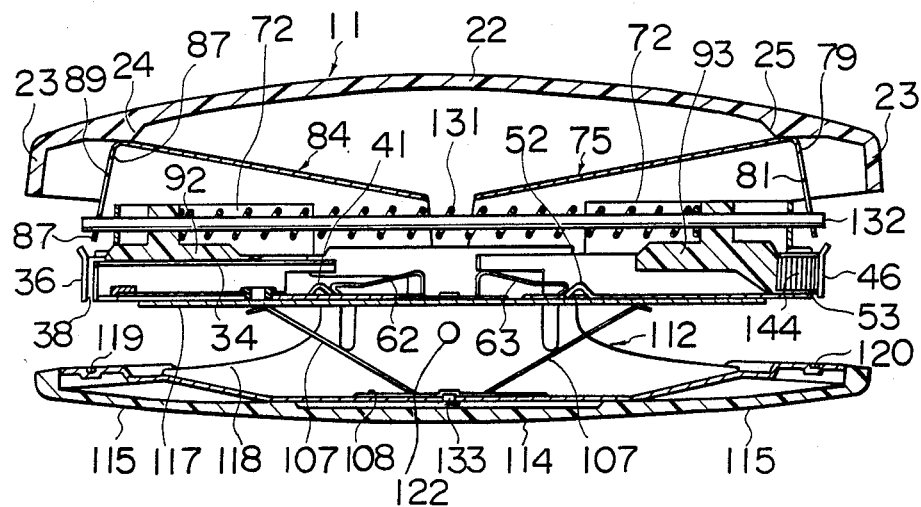
FIG. 3 is a front view showing, in longitudinal section, the embodiment of FIG. 1.
Figure 4:
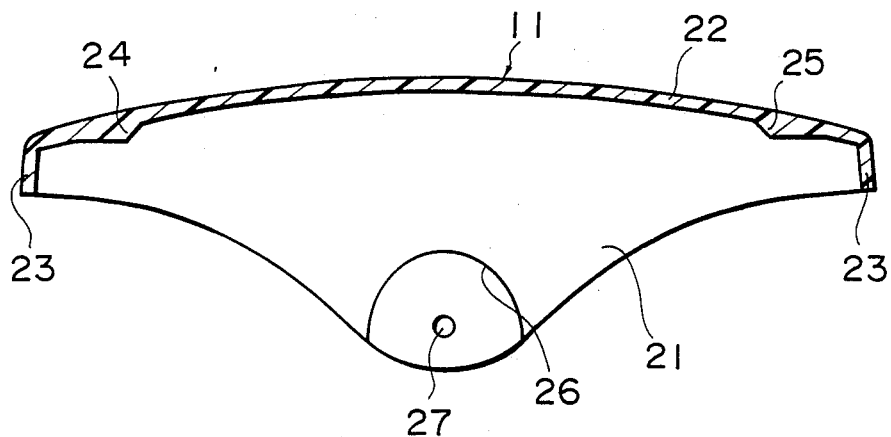
FIG. 4 is a front view showing, in longitudinal section, the embodiment of FIG. 1 in the state where the handle portion is removed.
Figure 5:
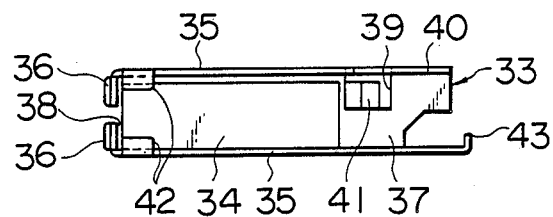
FIG. 5 is a plan view showing the first guide member in the staple case.
Figure 6:
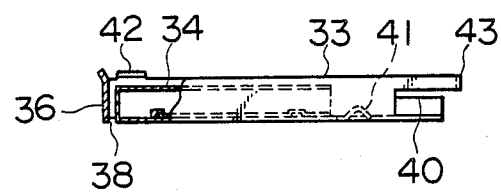
FIG. 6 is a front view showing, partly in section, the first guide member of FIG. 5.

As shown in FIGS. 1 and 3, the staple cases 12 are separated into a first staple case 31 for accommodating staples for temporary stapling (which will be described later) and a second staple case 32 for accommodating staples for regular stapling (which will be described later). As shown in detail in FIGS. 5 and 6, the first staple case 31 has a first guide member 33 formed by bending a metal plate substantially rectangularly so as to be open upward, and an angle-like shaped regular staple holder portion 34 formed of a similar metal plate and fixed into the first guide member 33. The front end portions 36 and 36 of side walls 35 and 35 at one end of the first guide member 33 are bent to block the opening portion thereof. An end of the bottom 37 of the first guide member 33 is located to form an opening 38 toward the inner surfaces of the front end portions 36 and 36, the opening 38 having a width equal to that of one staple so that only one staple can be passed through the opening 38. A substantially rectangularly cut portion 39 is formed in the other end of the bottom 37. A substantially triangular engagement/stopper projection 41 is formed in the cut portion 39 by bending work or the like. The front upper end portions of the side walls 35 and 35 are provided with staple stopper portions 42 and 42 formed by bending, the staple stopper portions 42 an 42 acting to stop the staples under the lower surfaces thereof. The rear portion of one side wall 35 is bent inwards to thereby form a coming-off prevention portion 43. The rear upper end of the other side wall 35 is provided with a small step portion 40 which is formed by cutting. The holder portion 34 has a horizontal surface and vertical surfaces, the horizontal surface being arranged at a sufficient gap from the lower surfaces of the staple stopper portions 42 and 42 to make it possible to pass the staples through the gap, the vertical surfaces being respectively arranged at gaps from the side walls 35 to make it possible to pass the leg portions of the staples through the gaps.

Figure 7:
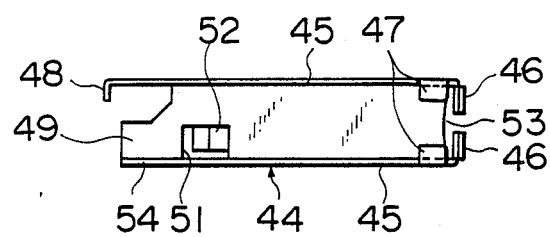
FIG. 7 is a plan view showing the second guide member in the staple case.
Figure 8:
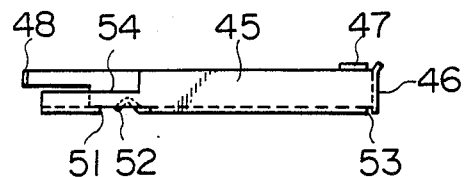
FIG. 8 is a front view showing the second guide member of FIG. 7.

As shown in detail in FIGS. 7 and 8, the second staple case 32 has a second guide member 44 formed by bending a metal plate substantially rectangularly so as to be open upward, in the same manner as the first guide member 33. The second guide member 44 has bent front end portions 46 and 46 and staple stopped portions 47 and 47 provided in the front ends of side walls 45 and 45, and a coming-off prevention portion 48 provided in the rear end portion of one side wall 45, in the same manner as the first guide member. Similarly, a cut portion 51 and an engagement/stoppage projection 52 are formed in the bottom 49 of the second guide member 44. An opening 53 having a width equal to that of one staple is formed between an end of the bottom 49 and the inner surfaces of the end portions 46 and 46. A small step portion 54 is formed in the rear upper end portion of the other side wall 45 by cutting.

As shown in FIGS. 1 and 3, the case cover 13 formed of a metal plate is provided to hold the first and second guide members 33 and 44 between the side portions 21 and 21 of the handle portion 11. As shown in detail in FIGS. 9 and 10, the case cover 13 has a cover body 56 substantially U-spaped in section. A pair of supporting shafts 58 and 59 horizontally separated from each other are disposed in the middle outside of each of opposite side walls 57 and 57 of the cover body 56 so that those supporting shafts 58 and 59 extend perpendicularly to the side walls 57 and 57. In the middle of the bottom 61 of the cover body 56, first and second lock springs 62 and 63 for locking the first and second guide members 33 and 44 at predetermined positions are fixed in parallel to each other by means of screws 64 and 64, respectively. The second lock spring 63 is the same as the first lock spring 62. Hereinafter, the first lock spring 62 will be described with reference to FIG. 11. The first lock spring 62 extends longitudinally in the cover body 56 and has opposite ends biased to press the bottom 61 elastically. At first guide member 33 side an end of the first lock spring 62 is bent diagonally to the lower inside, thereby forming a claw portion 65 fitted to the cut portion 39 of the first guide member 33. At the second guide member 44 side an end of the first lock spring 62 is provided with a contact portion 66 erected substantially vertically to come in contact with one side wall 57 of the cover body 56 elastically. Similarly, the second lock spring 63 has a claw portion 67 fitted to the cut portion 51 of the second guide member 44, and a contact portion 68 elastically contacting with the other wall 57 of the cover body 59.

The cover body 56 has upper frames 71 and 71 at its opposite end portions except the upper of the first and second lock springs 62 and 63, the upper frames 71 and 71 being formed by bending the ends of the side walls 57 and 57 inwards substantially perpendicularly to the side walls 57 and 57. The ends of the upper frames 71 and 71 are further bent upwards substantially perpendicularly to the upper frames 71 and 71, thereby forming upper side walls 72 and 72 disposed at a distance narrower than the distance between the side walls 57 and 57. The end portions 73 and 73 of the upper side walls 72 and 72 in the opposite ends of the cover body 56 are bent to abut on each other, so that insertion openings 74 and 74 are formed over the end portions 73 and 73. The end portions 73 and 73 are formed to extend outwards from the opposite ends of the cover body 56.

As shown in FIG. 3, the staple pressing-out portions 14 are constituted by a pair of staple drive-out plates which are arranged to cover the pair of staple cases 12, respectively. The staple pressing-out portions 14 will be described hereunder more in detail with reference to FIGS. 12 through 16. FIG. 12 shows a stapler drive-out plate 75 in the regular staple pressing-out portion. The stapler drive-out plate 75 is formed of one metal plate such as a steel plate having strength and durability and has a reversed U-shape which is formed by a roof plate portion 76 and a pair of side portions 77 and 77 extending downwards from the opposite sides of the roof plate portion 76. One end (opening portion) of the staple drive-out plate 75 is bent downwards substantially perpendicularly to the plate 75, thereby forming a drive-out portion 79 for driving out the staple by its lower end. The drive-out portion 79 is provided with a slot 81 formed so as to extend vertically substantially in the middle. Belt-like spring portions 82 and 82 respectively extending from the drive-out side downwards to the other side are formed in the opposite end portions of the roof plate portion 76 by die cutting or the like. Engagement/stoppage holes 83 and 83 are formed in the ends of the side portions 77 and 77 opposite to the drive-out portion 79, respectively.

Another staple drive-out plate 84 in the temporary staple pressing-out portion has a roof plate portion 85, a pair of side portions 86 and 86, a drive-out portion 87 and a pair of spring portions 88 and 88, which are formed in the same manner as the stapler drive-out plate in the regular staple pressing-out portion. The lower end of the drive-out portion 87 is slightly curved as shown in FIG. 14. A slot 89 and engagement/stoppage holes 91, similar to the slot 81 and the engagement/stoppage holes 83, are formed in the drive-out portion 87 and the side portions 86 and 86, respectively.

The staple cases 12 include a temporary staple pressing-out member 92 as shown in FIG. 15 and a regular staple pressing-out member 93 as shown in FIG. 16, respectively. The temporary staple pressing-out member 92 integrally formed of synthetic resin has a base portion 94 in surface-contact with the holder portion 34 of the first guide member 33, a side portion 95 extending downwards from one longitudinal side of the base portion 94, a projection portion 96 extending longitudinally in the middle of the upper surface of the base portion 94, and an upper projection portion 97 projecting more upwards in the middle of the projection portion 96. An insertion hole 98 parallel to the longitudinal direction of the base portion 94 is formed in the upper projection portion 97. The respective widths of the projection portion 96 and the upper projection portion 97 taken in a direction perpendicular to the longitudinal direction of the base portion 94 are determined to be so sufficient that the projection portions 96 and 97 are movable in the interval between the upper side walls 72 and 72 as shown in FIG. 9.

As shown in FIG. 16, the regular staple pressing-out member 93 formed of synthetic resin has a base portion 101, a projection portion 102 and an upper projection portion 104 provided with an insertion hole 103 communicated with the insertion hole 98, the portions being similar to those of the temporary staple pressing-out member 92. However, the regular staple pressing-out member 93 has a pair of side portions 105 disposed in the left and right thereof, each of the side portions 105 being similar to the side portion 96.

As shown in FIGS. 3 and 17, the spring portion 15 formed of one belt-like metal plate such as a steel plate having elastic strength and durability is constituted by a base portion 106 disposed in the middle, and a pair of elastic supporting portions 107 and 107 disposed longitudinally in the opposite sides so as to be inclined upwards obliquely. As shown in FIG. 17, the elastic supporting portions 107 and 107 are cut at their insides so that the cut-remaining portions 108 and 108 extend in one and the same plane containing the base portion 106. A screw hole 109 is formed substantially in the center of the base portion 106.

As shown in detail in FIGS. 18 through 20, the base portion 16 has a belt-like matrix portion 111 formed of synthetic resin, and an outer frame 112 formed of a metal plate and mounted on the matrix portion 111. The matrix portion 111 has a fringe projection 113 projecting upwards on the fringe thereof, a flat portion 114 disposed on the lower surface thereof, and a curve portion 115 disposed in the range from the longitudinally opposite ends of the flat portion 114 to the ends of the matrix portion 111. The outer frame 112 formed of a metal plate is mounted into a cavity surrounded by the fringe projection 113. The outer frame 112 has a bottom 117 fitted into the cavity, and side walls 118 extending from the longitudinally opposite sides of the bottom 117 substantially perpendicularly to the bottom 117. Guide grooves 119 and 120 for bending the leg portions of the staple are formed in the vicinity of the opposite ends of the bottom 117 in the same manner as those of the conventional stapler. A screw hole 121 is formed substantially in the middle of the bottom 117. The side walls 118 are formed so as to be swollen in the middle. Case cover supporting shafts 122 and 122 are mounted in the outer middle of the swollen portion so as to be located on one axial line perpendicularly to the side walls 118, respectively. Pairs of guide projections 123 and 123 extending downward substantially parallel and symmetrically with respect to the supporting shafts 122 and 122 are formed in the inner middle of the swollen portion so as to project inward, respectively.

In the following, assembling of the handle portion 11, the staple cases 12, the case cover 13, the staple pressing-out portions 14 the spring portion 15 and the base portion 16 is described. First, the first and second guide members 33 and 44 shown in FIGS. 5 through 8 are inserted into the opposite end opening portions formed by the side walls 71 and 71 of the case cover 13 as shown in FIGS. 9 and 10. In other words, the first guide member 33 is inserted into the left-end opening portion in FIG. 9 from the coming-off prevention portion 43 till the claw portion 65 of the lock spring 62 is engaged with the end of the cut portion 39 of the first guide member 33. Similarly to the first guide member 33, the second guide member 44 is inserted into the right-end opening portion in FIG. 9 from the coming-off prevention portion 48 till the claw portion 65 of the lock spring 63 is engaged with the end of the cut portion 51. Then, the staple pressing-out member 92 shown in FIG. 15 is inserted into the first guide member 33 from the middle opening portion of the case cover 13. That is to say, the base portion 94 of the staple pressing-out member 92 is put on the holder portion 34 of the first guide member 33 while the side portion 95 of the staple pressing-out member 92 is located in the interval between the holder portion 34 and the side wall 35. On the other hand, the second guide member 93 with the upper projection 104 faced upwards and the side portions 105 faced downwards is inserted into the middle opening portion of the case cover 13.

A coiled spring 131 shown in FIG. 3 is disposed between the upper projections 97 and 104 of the staple pressing-out members 92 and 93. Then, one end of a rod member 132 is inserted into the insertion hole 98 or 103 of one staple pressing-out members 92 or 93 from one insertion opening 74 of the case cover 13 and passed through the other insertion opening 74 of the case cover 13 through the center hole of the coiled spring 131 and the insertion hole 103 or 98 of the other staple pressing-out member 93 or 92. The axial length of the coiled spring 131 is selected to be sufficient to press the two staple pressing-out members 92 and 93 respectively toward the forward end portion 36 of the first guide member 33 and the forward end portion 46 of the second guide member 44. The length of the rod member 132 is selected to be larger than the length of the case cover 13.

After the staple cases 12 have been mounted into the case cover 13 as described above, the staple pressing-out portion 14 is mounted as follows. As shown in FIG. 21, while one end of the rod member 132 is passed through the slot 89 provided in the drive-out portion 87 of the temporary staple pressing-out plate 84, the engagement/stoppage holes 91 and 91 formed in the opposite side portions 86 are fitted onto the supporting shafts 58 and 58 provided on the side walls 57 and 57 of the case cover 13. The fitting operation can be carried out more easily by widening the interval between the opposite side walls 57 and 57. The regular staple pressing-out plate 75 is mounted to the case cover 13 in the same manner as described above. To prevent the rod member 132 from dropping out of the slots 81 and 89, washers (not shown) may be mounted onto the end portions of the rod member 132 projecting from the drive-out portions 79 and 87 of the staple pressing-out plates 75 and 84 or the end portions of the rod member 132 may be deformed to form enlarged diameter portions.

As shown in FIG. 3, the middle portion of the spring portion 15 is fixed to the bottom 117 of the outer frame 112 of the base portion 16 with a screw 133. That is to say, the bottom 117 of the outer frame 112 and the spring portion 15 are fixed by driving the screw 133 while adjusting the screw hole of the bottom 117 of the outer frame 112 and the screw hole 109 of the spring portion 15 to agree with each other.

Lastly, the case cover 13 is put on the spring portion 15 so that the lower surface of the case cover 13 is supported by the elastic supporting members 107 and 107 of the spring portion 15. Then, the handle portion 11 is put on the case cover 132. That is to say, the handle portion 11 is put on the case cover 13 while the interval between the side portions 21 of the handle portion 11 is slightly widened to sandwich the side walls 57 and 57 of the case cover 13 between the side portions. At the same time, the support shaft 122 of the side wall 118 of the base portion 16 is fitted into the engagement/stoppage hole 27 while the forward ends of the supporting shafts 58 and 59 of the case cover 13 are located under the rib edge 26. Accordingly, the handle portion 11 can be turned around the supporting shaft 122, as well as the supporting shafts 58 and 59 for pivotally supporting the staple cases 12, the case cover 13 and the staple pressing-out portions 14 are never disjointed from the arc-shaped cavity formed by the rib edge 26.

Figure 24:
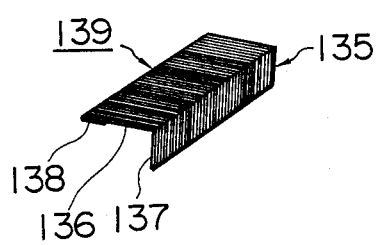
FIG. 24 is a perspective view showing a bar of staples for temporary stapling.

In the following, the staple used in the stapler is described. FIG. 24 shows a bar of temporary staples 135. Each of the temporary staples 135 has a supporting portion 136 and a stapling leg portion 137 bent substantially perpendicularly to the supporting portion 136. The other end 138 of the horizontal portion 136 is bent back to the rear surface of the supporting portion 136 in advance. The staples 135 in the predetermined number are separably connected in the form of a bar of staples 139 in the same manner as the conventional staples.

Figure 25:
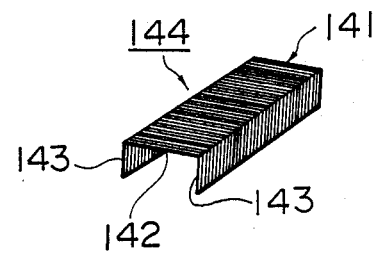
FIG. 25 is a perspective view showing a bar of staples for regular stapling.

FIG. 25 shows regular staples 141. Each of the regular staples 141 has a horizontal portion 142 and two leg portions 143 and 143 respectively extending downwards substantially vertically from the opposite ends of the horizontal portion 142, in the same manner as the conventional staples. The staples 141 are separably connected in the form of a bar of staples 144 in the same manner as the conventional staples.

Figure 23:
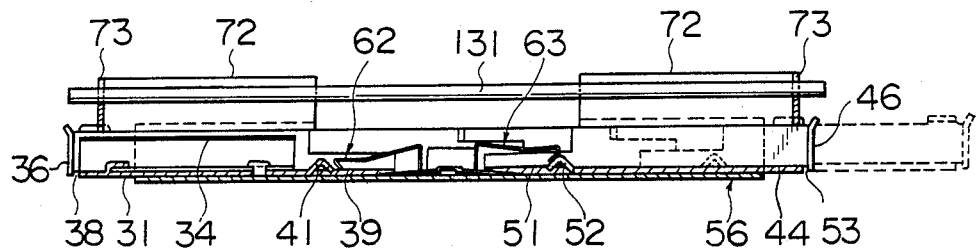
FIG. 23 is a partially cutaway front view showing, in longitudinal section, the condition in which the staple cases and the case cover are assembled into one assembly.

As to the manner how to load these staples 135 and 141 into the stapler, the case where the regular staples 141 are put into the stapler will be described, by way of example, with reference to FIGS. 21 and 23. When the end portion 46 of the second guide member 44 is pressed in the direction of the arrow A as shown in FIG. 21, the claw portion 65 of the lock spring 63 which has been engaged with the edge of the cut portion 51 of the second guide member 44 is engaged with the engagement/stoppage projection 52 of the cut portion 51 so that the claw portion 65 is moved up as shown in FIG. 23. In this condition, the second guide member 44 is automatically pressed out, as shown in the dot line of FIG. 21, by the staple pressing-out member 93 urged toward the end portion 73 of the upper side wall 72 by the coiled spring 131. Accordingly, the second guide member 44 can be taken out as shown in the dot line of FIG. 23 while the thus projected portion is nipped by fingers. The staple bar 144 is inserted into the second guide member 44 while the horizontal portions 142 of the respective staples 141 are faced upwards. Then, the end portion 46 of the second guide member 44 is pressed in the direction of the arrow A of FIG. 21. The pressing operation is continued till the claw portion 65 of the lock spring 63 is engaged with the edge of the cut portion 51 of the second guide portion 44. Accordingly, the second guide member 44 is locked again in the predetermined position in the case cover 13.

The same operation is carried out with respect to the first guide member 33 for the temporary staples 135. After the first guide member 33 is pulled out, the supporting portions 136 of the temporary staples 135 are put on the holder portion 34 while the stapling leg portions 136 of the respective temporary staples 135 are inserted into the interval between the side wall of the holder portion 34 and the side wall 35 of the first guide member 33.

In the following, the case where the staples 135 and 141 thus loaded in the stapler are used for fastening a slip 148 on a sheet of ground paper 145 is described.

Figure 26:
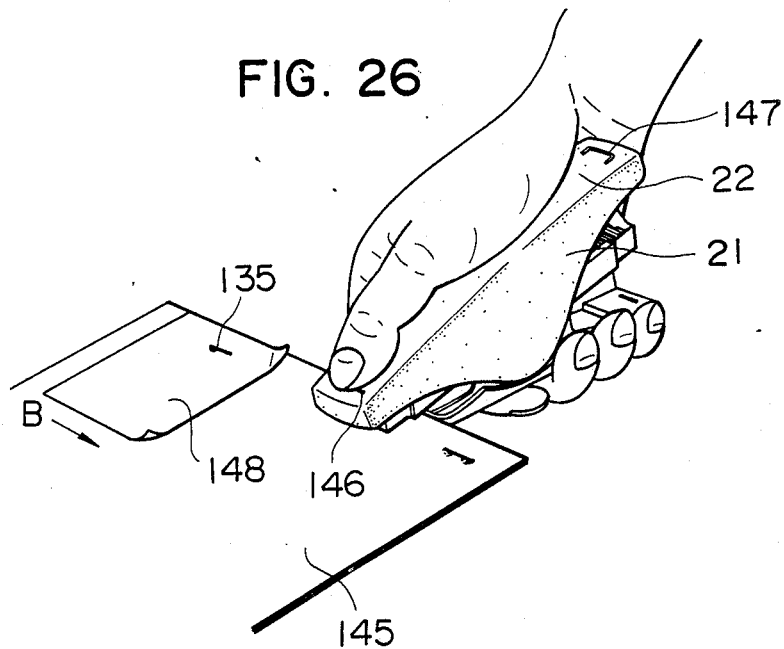
FIG. 26 is a perspective view for explaining the condition in which the stapler is used practically.
Figure 27:
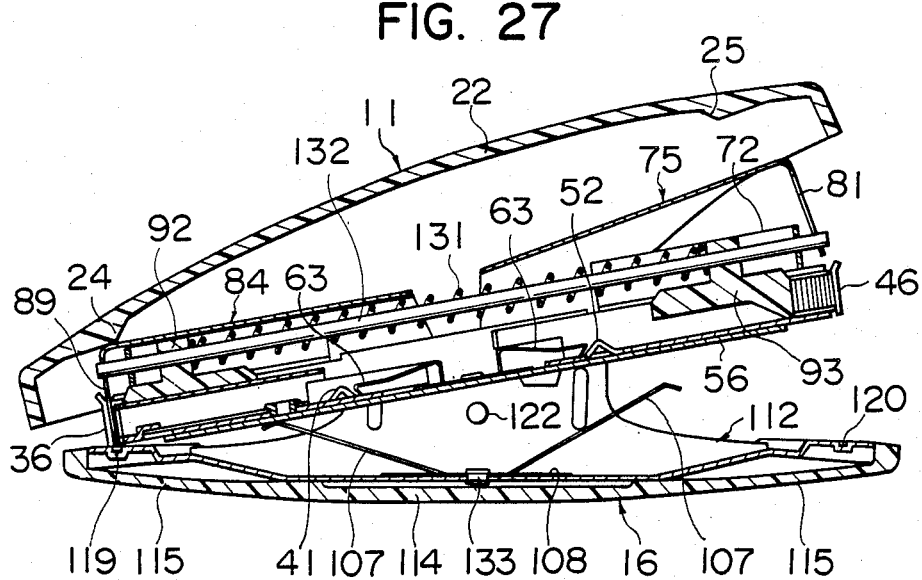
FIG. 27 is a front view showing, in longitudinal section, the inside of the stapler depicted in FIG. 26.
Figures 28, 29:
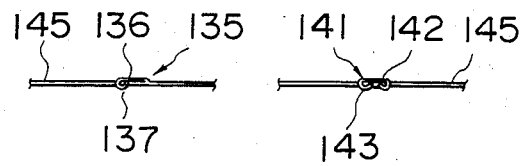
FIG. 28 is a sectional view showing the condition in which a staple for temporary stapling is used.
FIG. 29 is a sectional view showing the condition in which a staple for regular stapling is used.

Marks 146 and 147 for identifying the staple as to whether the staple under the mark is for temporary stapling or regular stapling are provided in the opposite ends of the roof plate portion 22 of the handle portion 11. Now the case where the slip 148 is to be fastened to the ground paper 145 with the temporary staple 135 is described. As shown in FIG. 3, the case cover 13 is kept substantially horizontally relative to the base portion 16 by the elastic supporting portions 107 and 107 of the spring portion 15, so that a space for insertion of sheets, for example, the ground paper 145 and the slip 148, to be stapled is formed between each of the guide grooves 119 and 120 and corresponding one of the opposite ends of the staple case 12. Now the ground paper 145 and the slip 148 are inserted into the space at the temporary stapling mark 146 side. By applying the thumb on the portion of the mark 146 and applying the fingers on the rear surface of the matrix portion 111 of the base portion 16 as shown in FIG. 26, the mark 146 portion is pressed down. As the result, the staple drive-out plate 84 abutting on the projection 24 in the rear surface of the roof plate portion 22 of the handle portion 11 is turned downwards around the supporting shafts 58 and 58, so that the lower end of the drive-out portion 87 strikes on the supporting portion 136 of forward one of the temporary staples 135 abutting the forward end portion 326 of the staple case 12. The forward one of the staples 135 is separated from the staple bar 139 by further applying pressure and is moved downwards through the opening 38 of the staple case 12, so that the stapling leg portion 137 of the staple 135 pieces the ground paper 145 through the slip 148, reaches the guide groove 119 and is bent inwards by the guide groove 119. On the other hand, the other end of the staple 135 is merely pressed onto the slip 148. In this condition, the configuration of the stapler as the whole is as shown in FIG. 27. If the force applied on the temporary stapling mark 146 side is removed now, the case cover 13 is kept horizontally by the spring portion 15 and, at the same time, the staple pressing-out portion 14 is returned to an original position as shown in FIG. 3 by the spring portions 88 and 88 of the staple pressing-out portion 14. Because the drive-out portion 87 is departed from the opening 38 by the return of the staple pressing-out portion, next forward one of the staples 135 is located in the opening 38 by the staple pressing-out member 92 urged toward the opening 38 by the coiled spring 131.

The slip 148 thus fastened to the ground paper 145 can be easily unfastened by shifting the slip 148 in the direction of the arrow B of FIG. 26, because the slip 148 is fastened to the ground paper 145 with only one stapling leg portion 137 of the temporary staple 135. Further, the slip 148 can be unfastened with no injury because the other end 138 of the supporting portion 136 of the temporary staple 135 is bent inwards in advance.

In the case where the slip 148 is to be fastened regularly, the slip 148 can be fastened to the original paper in the same manner as the conventional stapler by moving down the end of the handle portion 11 at the regular stapling mark 147 side while putting the ground paper 145 and the slip 148 in the gap between the guide groove 120 at the mark 147 side and the forward end portion of the staple case 12.

Figure 30:
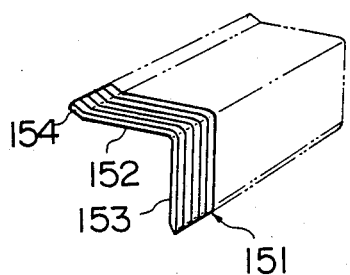
FIG. 30 is a perspective view showing another embodiment of a bar of staples for regular stapling.
Figure 31:
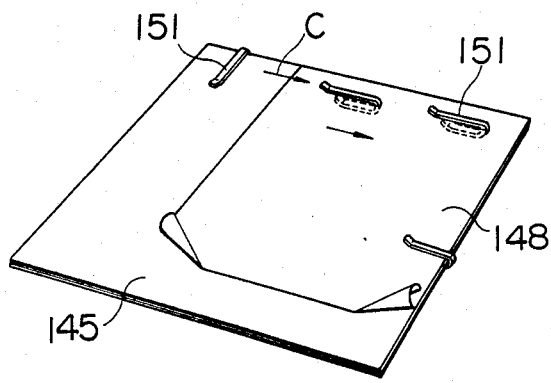
FIG. 31 is a perspective view showing the condition in which stapling is performed by use of the staples depicted in FIG. 30.

FIGS. 30 and 31 show another embodiment of the temporary staple. In this embodiment, each of the temporary staple 151 has a supporting portion 152 and a stapling leg portion 153 extending downwards substantially vertically from one end of the supporting portion 152. At the other end of the supporting portion 152, a projecting portion 154 inclined slightly upwards is formed. By forming such a projecting portion 154, the staple 151 can be more easily disjointed from the slip 148 with no injury if the projecting portion 154 is pushed in the direction of the arrow C. Further, the staple 151 can be used as a ordinary clip if the stapling leg portion 153 is bent in the vicinity of the edge of the ground paper. In this case, the slip 148 can be clipped to the ground paper 145 perfectly with no injury.

Figure 32:
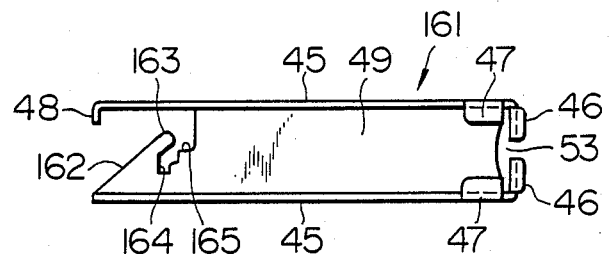
FIG. 32 is a plan view showing the external guide member in a further embodiment in which the staple case is modified.
Figure 33:
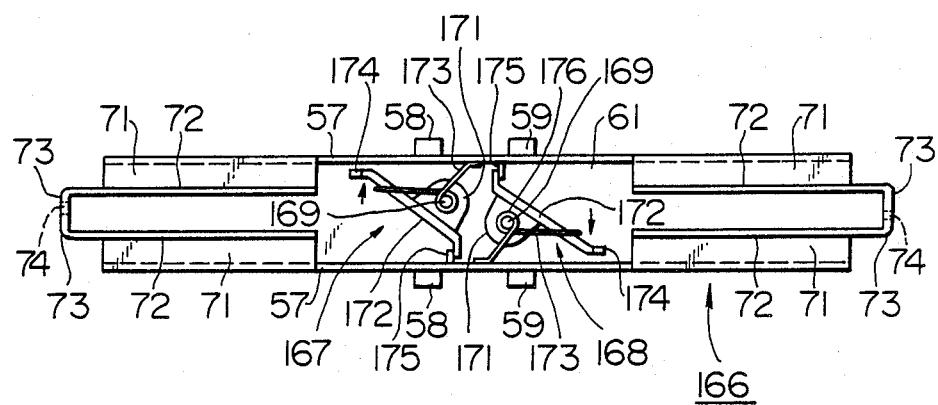
FIG. 33 is a plan view showing the case cover used for the external guide member depicted in FIG. 32.
Figure 34:
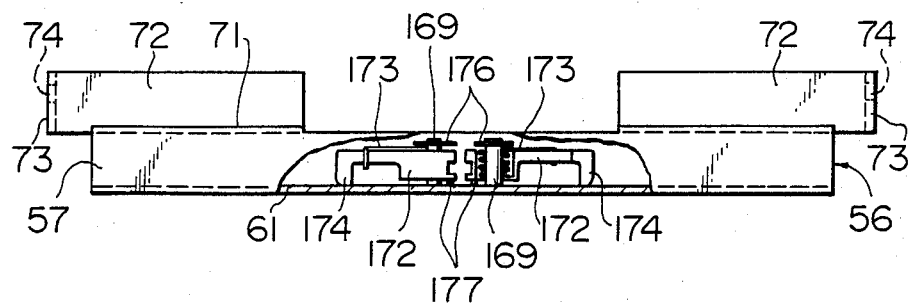
FIG. 34 is a partially cutaway front view showing the case cover of FIG. 33.

FIGS. 32 through 34 show a second embodiment of the stapler in which the first and second guide members 34 and 44 and the case cover 13 are modified. Like parts in each of the first embodiment and the second embodiment are correspondingly referenced. Referring to FIG. 32, there is shown a second guide member 161 for regular stapling. The second guide member 161 has side walls 45 and 45, end portions 46 and 46, staple pressing portions 47 and 47, and an coming-off prevention portion 48, in the same manner as the second guide member 44. The bottom 162 of the second guide member 161 has a guide edge generally composed of four sides, that is, an inclined edge portion 162 inclined from one side wall 45 having the coming-off prevention portion 48 toward the other side wall 45, a pointed end portion 163 cut inwards from one end of the inclined edge portion 162 back to the inclined edge side, a substantially L-shaped extension portion 164 extending from an end of the pointed end portion 163 opposite to the inclined edge portion 162, and a rear end portion 165 having two steps continued from an end of the extension portion 164 and a portion extending from the steps to the side wall 45 provided with the coming-off prevention portion 48, substantially perpendicularly to the side wall 45. Though not shown, the same guide edge is formed in the first guide member for temporary stapling.

As shown in FIGS. 33 and 34, a case cover 166 is formed in the same manner as the aforementioned case cover 13, except that different engagement/stoppage means are provided in a bottom 61 thereof. A pair of engagement/stoppage means 167 and 168 are provided substantially in the middle of the bottom 61. The engagement/stoppage means 167 and 168 means are the same in construction, and therefore one engagement/stoppage means 168 located in the second guide member 161 side will be described hereunder in detail. The engagement/stoppage means 168 has a supporting plate 171 pivotally supported by a supporting shaft 169 erected from the bottom 61, a rotary plate 172 attached to one side edge of the supporting plate 171 substantially perpendicularly to the latter, and a spring 173 for elastically biasing the rotary plate 172 clockwise. The rotary plate 172 has an engagement portion 174 projecting downwards at its one end and capable of being engaged with the guide edge of the second guide member 161. To prevent the rotary plate 172 from turning clockwise over a predetermined quantity, the other end of the rotary plate 172 is arranged to be engaged with a turn limiting plate 175 projecting from the inner surface of one side wall 57 in the position as shown in the drawing. The spring 173 has one leg portion engaged with the turn-direction rear surface of the rotary plate 172 and the other leg portion engaged with the other side wall 57 disposed opposite to the one side wall 57 provided with the turn limiting plate 175, so that the rotary plate 172 is urged to rotate clockwise by use of the contacting force of the respective leg portions of the spring 173. A washer 176 for preventing the spring 173 from coming off is provided onto the upper end of the supporting shaft 169. A supporting leg 177 for keeping the supporting plate 171 substantially horizontally is attached to one end portion of the supporting plate 171 opposite to the other end portion where the rotary plate 172 is attached.

The other engagement/stoppage means 167 for the temporary stapling first guide member is formed in the same manner as described above, except that the means 167 has an engagement portion 174 located in the opposite side and a turn limiting plate 175 attached to the other side wall 57.

If, for example, the second guide member 161 shown in FIG. 32 is pressed into the case cover from the right side in FIG. 33 with the coming-off prevention portion 48 put in the leading end, the engagement portion 174 of the engagement/stoppage means 168 is engaged with the inclined edge portion 162 of the guide edge of the bottom 49 and moved up in FIG. 33 along the inclined edge portion 162 against the elastic force of the spring 173. As the result, the rotary plate 172 rotates counterclockwise. When the second guide member 161 is further pressed into the case cover, the engagement portion 174 rides over the peak of the pointed end portion 163. In this condition, the rotary plate 172 is rotated clockwise by the elastic force of the spring 173 so that the engagement portion 174 at the forward end of the rotary plate 172 is located in the extension portion 164. As the result, the engagement of the engagement portion 174 with the extension portion 164 prevents the second guide member 161 from moving to the right even if the staple pressing-out member 93 is pressed by the coiled spring 131 to thereby urge the second guide member 161 to move to the right. Drawing the second guide member 161 can be carried out by pressing the guide member 161 more to the left. By pressing the guide member 161 leftwards, the engagement portion 174 moves up in FIG. 32 along the step portion of the rear end portion 165 and then moves up along the linear portion of the rear end portion 165, so that the engagement portion 174 abuts on the inner surface of the side wall 45. If the guide member 161 is pulled rightwards when the rotary plate 174 abuts on the inner surface of the side wall 45 and cannot move any more, the engagement portion 174 can be taken out of the guide edge through the interval between the pointed end portion 163 and the side wall 45. Accordingly, the rotary plate 172 is rotated clockwise by the spring 173 so as to abut on the inclined portion 162 of the guide edge, so that the guide member 161 can be pulled out. Similarly, the locked temporary stapling first guide member can be pulled out in the same manner as described above.

Although the foregoing embodiments have shown the case where the stapler has both a temporary stapler portion and a regular stapler portion, it is to be easily understood by not only a skilled person in the art but those other than such a skilled person that a stapler exclusively used for temporary stapling can be provided if the regular stapler portion is removed from the aforementioned stapler while leaving both supporting holes 27 of the handle portion 11 and the supporting shaft 122 of the base portion 16 and the handle portion is changed to cover the staple pressing-out portion.

While the invention has been described with respect to its preferred embodiments, it is to be understood that the words which have been used are words of description rather than limitation and that various changes and modifications may be made in the invention without departing from its scope as defined in the appended claims.

What is claimed is:

1. A stapler capable of selectively using a first staple for performing temporary stapling and a second staple for performing regular stapling, said first staple having a supporting portion and a single stapling leg portion extending from an end of said supporting portion substantially perpendicularly to said supporting portion, said second staple having a supporting portion and two stapling leg portions extending from opposite ends of said supporting portion substantially perpendicularly to said supporting portion, said stapler comprising:

a handle portion having a substantially rectangularly-shaped upper surface, and side walls extending downwards at longitudinally opposite ends thereof;

a case cover swingably disposed between said side walls of said handle portion and having longitudinally opposite opened ends;

first and second staple cases slidably inserted into said case cover respectively from said longitudinally opposite opened ends of said case cover, said first and second staple cases respectively having first and second staple drive-out openings formed at respective end portions of said first and second staple cases projected out from said longitudinally opposite opened ends of said case cover respectively, said first and second staple drive-out openings having size corresponding to thickness of said first and second staples, said first and second staples loaded in said first and second staple cases being elastically urged to said first and second staple drive-out openings respectively;

first and second staple pressing-out portions pivotally mounted between said handle portion and said case cover and respectively having first and second forward end portions arranged to be passed downward through said first and second staple drive-out openings of said first and second staple cases respectively;

a base portion having a middle portion pivotally attached to a substantially middle of said case cover, and having first and second guide grooves for bending said stapling leg portion of said first staple and for bending said stapling leg portions of said second staple respectively, said first and second guide grooves being formed at opposite ends of an upper surface of said base portion;

an elastic member disposed between said base portion and said case cover for elastically pressing said base portion and said case cover so as to widen intervals between said first groove and said first staple drive-out opening and between said second groove and said second staple drive-out opening;

said first staple case including a substantially U-shaped body provided with said first staple drive-out opening formed at its forward end portion, and a staple holder attached in said body, said staple holder having a height substantially equal to the height of said stapling leg portion of said first staple, said staple holder having a side portion disposed at a sufficient interval from one side wall of said body so as to allow said stapling leg portion of said first staple to pass through said interval, said staple holder further having one surface extending substantially horizontally from an upper end of said side portion to another side wall of said body.

2. A stapler according to claim 1, in which said first and second staple cases respectively include first and second slide members provided therein for pressing said first and second staples accommodated therein toward said first and second staple drive-out openings respectively, said stapler further including a connection member slidably passing through said first and second slide members and a coiled spring loosely fitted on said connection member and disposed between said first and second slide members to elastically press the first and second slide members opposite to each other.

3. A stapler according to claim 1, in which said first and second staple cases respectively have first and second substantially rectangularly cut portions formed in respective bottom portions thereof and first and second upward inclined portions formed so as to communicate with said first and second cut portions at said first and second staple drive-out opening sides respectively, and in which said case cover has first and second elastic stopper members formed on its bottom portion, said first and second elastic stopper members having first and second forward ends biased downwards elastically so that said first and second staple cases are locked in first and second accommodating positions respectively in said case cover when said first and second forward ends engage with respective ends of said first and second cut portions respectively, and said first and second staple cases are unlocked from said first and second accommodating positions when said first and second elastic stopper members ride on said first and second inclined portions respectively.

4. A stapler according to claim 1, in which said first and second staple cases have first and second guide edges formed on their bottom portions at end portions opposite to said first and second staple drive-out openings respectively, in which said case cover has first and second rotary members provided on its bottom portion for said guide edges of said first and second staple cases respectively, said first and second rotary members being elastically biased in one direction and respectively having first and second engagement portions arranged to engage with said first and second guide edges at their one ends respectively, and in which said first and second guide edges are respectively composed of first edges inclined from respective one side walls of said first and second staple cases toward the respective other side walls of the same so as to turn said first and second rotary members against its bias force when said guide edges are engaged with the respective one ends of said first and second rotary members, second edges extending from respective forward ends of said respective first edges toward said respective one side walls of said first and second staple cases so as to keep said first and second rotary members in the condition that the respective forward ends of said first and second rotary members are rotated by said bias force, and third edges respectively extending from said second edges toward said other side walls of said first and second staple cases so as to turn the respective forward ends of said first and second rotary members against said bias force.

5. A stapler according to claim 1, in which said elastic member is formed of a plate spring material having a flat middle portion and inclined arm portions inclined upwards obliquely from opposite ends of said middle portion respectively, respective ends of said arm portions being engageable with a bottom of said case cover.

6. A stapler having at least one stapler portion for stapling a staple having a supporting portion and a stapling leg portion extending from an end of the supporting portion substantially perpendicularly thereto, comprising:
   a handle portion,
   a staple pressing-out portion attached under the handle portion,
   a staple accommodating portion having a staple drive-out opening at a forward end thereof, said staple drive-out opening having a size substantially equal to a thickness of the staple and allowing the pressing-out portion to pass therethrough so that said staple is pressed out through the staple drive-out opening, said staple accommodating portion including a staple holder having a substantially U-shaped body provided with said staple drive-out opening at a forward end thereof, a guide edge formed on a bottom of the staple holder at a side opposite to the staple drive-out opening, height substantially equal to height of the stapling leg portion, a side portion disposed away from one side wall of the staple holder to have an interval to allow the stapling leg portion of the staple to pass through the interval and an upper portion extending substantially horizontally from an upper end of the side portion to another side wall of the body, said staple accommodating portion further including a cover portion for slidably holding the stapler holder, and a rotary member provided on a bottom portion of the cover portion, said rotary member being elastically biased in one direction and having an engagement portion to engage the guide edge, said guide edge having a first edge inclined-relative to the side wall of the staple holder to turn the rotary member against biased force when the first edge is engaged with the engagement portion, a second edge extending from the first edge back to said side wall to allow the engagement portion of the rotary member to rotate by the biased force, and a third edge extending from the second edge to a direction opposite to said side wall to turn the engagement portion against the biased force so that the engagement portion disengages the staple holder to allow the staple holder to slide in the cover portion,
   a base portion disposed under the staple accommodating portion and pivotally supporting said handle portion, a part of the staple pressing-out portion and a part of the cover portion of the staple accommodating portion, said base portion having at least one guide for bending the stapling leg portion of the staple, and
   an elastic member disposed between the base portion and the cover portion of the staple accommodating portion for elastically pressing the base portion and the cover portion of the staple accommodating portion to widen a distance therebetween.

7. A stapler according to claim 6, in which said staple accommodating portion further includes a slide member slidably situated in the staple holder to urge the staple toward the staple drive-out opening, and a spring to push the slide member toward the staple drive-out opening.

8. A stapler having at least one stapler portion for stapling a staple having a supporting portion and a stapling leg portion extending from an end of the supporting portion substantially perpendicularly thereto, comprising:

a handle portion, a staple pressing-out portion attached under the handle portion, a staple accommodating portion having a staple drive-out opening at a forward end thereof, said staple drive-out opening having a size substantially equal to a thickness of the staple and allowing the pressing-out portion to pass therethrough so that said staple is pressed out through the staple drive-out opening, said staple accommodating portion including a staple holder having a substantially U-shaped body provided with said staple drive-out opening at a forward end thereof, a cut portion formed on a bottom of the staple holder at a side opposite to the staple drive-out opening, an upwardly inclined portion communicating with the cut portion, height substantially equal to height of the stapling leg portion, a side portion disposed away from one side wall of the staple holder to have an interval to allow the stapling leg portion of the staple to pass through the interval and an upper portion extending substantially horizontally from an upper end of the side portion to another side wall of the body, said staple accommodating portion further including a cover portion for slidably holding the stapler holder, and an elastic stopper member attached to the cover portion, said stopper member having a forward end biased downwardly so that the staple holder is locked in an accommodating position in the cover portion when the forward end of the elastic stopper member engages the cut portion, and the staple holder is unlocked from the accommodating position to allow the staple holder to slide in the cover portion when the elastic stopper member rides on the inclined portion of the staple holder, a base portion disposed under the staple accommodating portion and pivotally supporting said handle portion, a part of the staple pressing-out portion and a part of the cover portion of the staple accommodating portion, said base portion having at least one guide for bending the stapling leg portion of the staple, and an elastic member disposed between the base portion and the cover portion of the staple accommodating portion for elastically pressing the base portion and the cover portion of the staple accommodating portion to widen a distance therebetween.

9. A stapler according to claim 8, in which said staple accommodating portion further includes a slide member slidably situated in the stapler holder to urge the staple toward the staple drive-out opening, and a spring to push the slide member toward the staple drive-out opening.

10. A combination of a stapler according to claim 8, and a staple, said staple having a supporting portion and a stapling leg portion bent at one end of said supporting portion substantially perpendicularly to said supporting portion, said staple being arranged so that when said stapling leg portion is pierced through a stack of objects to be stapled and is bent to be in parallel to said supporting portion, said stack of objects is nipped between said supporting portion abutting on an upper surface of said stack of objects and said stapling leg portion abutting on a lower surface of said stack of objects.

11. A combination according to claim 10, in which the other end of said supporting portion is bent so as to be in contact with the rear surface of said supporting portion.

12. A combination according to claim 10, in which the other end of said supporting portion is inclined slightly upwards.

13. A combination according to claim 10, in which said staple is provided in the form of a bar of staples separably connected.

* * * * *